United States Patent
Schmoldt

(12) 
(10) Patent No.: US 6,609,386 B1
(45) Date of Patent: Aug. 26, 2003

(54) METHOD AND APPARATUS FOR REDUCING AIR BORNE ALLERGENS IN EVAPORATIVE AIR COOLERS

(76) Inventor: Hans Karl Schmoldt, 124 N. 22nd Ct., Grand Junction, CO (US) 81501

(*) Notice: Subject to any disclaimer, the term of this patent is extended or adjusted under 35 U.S.C. 154(b) by 0 days.

(21) Appl. No.: 10/064,034

(22) Filed: Jun. 4, 2002

(51) Int. Cl.[7] ............................................. F28C 1/00
(52) U.S. Cl. ............................................. 62/121; 62/311
(58) Field of Search .............................. 62/85, 121, 311

(56) References Cited

U.S. PATENT DOCUMENTS 6,133,061 A * 10/2000 Sonoda ........................ 438/69

* cited by examiner

*Primary Examiner*—Melvin Jones
(74) *Attorney, Agent, or Firm*—John D. Olivier, PLLC

(57) ABSTRACT

The invention relates to a method and apparatus for reducing air borne allergens in evaporative air coolers. In another aspect the invention relates to a method for reducing the cost of operating evaporative air coolers.

26 Claims, 1 Drawing Sheet

METHOD AND APPARATUS FOR REDUCING AIR BORNE ALLERGENS IN EVAPORATIVE AIR COOLERS

BACKGROUND OF INVENTION

Evaporative air coolers have been produced and used for more than 50 years. They are devices that use the heat of vaporization of water to cool the air. Such devices have been used around the world and are relatively inexpensive to build and operate compared to refrigeration air conditioning systems. However, it is well established that while refrigeration air conditioning systems are the preferred method to cool homes and businesses, they are expensive to purchase, install and operate. Further, in refrigeration air conditioning systems the air can be filtered using sophisticated filters, such as electrostatic filters, to remove dust, pollen and germs, etc. Also, these systems de-humidify the air, so they are useful in all climates. On the other hand, evaporative air coolers add water vapor or moisture to the air in order to cool it. They are most useful in desert or dry climates where the additional water vapor added to the air to cool it does not raise the relative humidity in the area being cooled to an uncomfortable level. Also, they are used where the cost to purchase, install and operate an air conditioning system is an important consideration. Filter systems mentioned above are not generally used in evaporative air coolers due at least in part to the added expense for purchase and installation of such filters.

For many years, evaporative air coolers have been constructed from metal and as a result over time they will rust and have to be replaced. In more recent times, a device was placed in the water bath compartment of the evaporative air cooler to act as a sacrificial anode. These devices were usually a small zinc plate or a magnesium rod with a wire attached to the zinc plate or the magnesium rod. The end of the wire not attached to the zinc plate or the magnesium was then attached to the metal housing of the evaporative air cooler with a sheet metal screw.

In the last several years, the housings of evaporative air coolers have been constructed from non-metallic materials and thus are immune to the past problems of the housing rusting out. Since the housing is not subject to rusting and the non-metallic housing eliminates the electrolytic action necessary for the zinc plate or the magnesium rod to function as a sacrificial anode, sacrificial anodes have not been used in evaporative air coolers having a non-metallic water bath compartment.

The introduction of evaporative air coolers with non-metallic water bath compartments has been very successful. The housings of such evaporative air coolers generally last much longer than such coolers having metal housings. However, evaporative air coolers with non-metallic water bath compartments still suffer from several major problems.

New evaporative air coolers with non-metallic housings and those that have been re-conditioned by installing new porous high surface area material in the louvered sides, after being in operation for only a short time almost always result in a musty odor imparted to the air. When the evaporative cooler is turned off, especially during the daytime when the sun heats up the inside of the evaporative cooler, the heat and humidity of the environment inside the evaporative cooler promotes rapid growth of bacteria and mold, mildew and similar fungi. The bacteria and fungi growing on the various surfaces of the evaporative cooler results in the musty odor produced by evaporative air coolers and the musty odor is generally regarded as the reason such coolers are sometimes called "swamp coolers". Further, asthma and allergy sufferers and those with hay fever generally experience an increase in bronchial congestion and allergy and hay fever symptoms when the evaporative air cooler is in use. To help alleviate the bronchial congestion and allergy and hay fever symptons, it is general practice to replace the porous high surface area material used in the walls of evaporative coolers with new material at least annually or after each season of use. While it is not extremely expensive to replace the porous high surface area material, the cost in labor and materials is not insignificant.

Accordingly, there is a substantial need to improve the operation of evaporative air coolers with non-metallic water bath compartments. Further, there is the need to improve the operation of such evaporative air coolers without a significant increase in cost. Still further there is the need to improve the air quality produced by such evaporative air coolers and specifically to reduce the symptoms of asthma, allergy and hay fever sufferers when exposed to air from such evaporative air coolers.

SUMMARY OF INVENTION

One object of the invention is to provide a method and apparatus of improving air quality produced by the use of evaporative air coolers having a housing with a nonmetallic water bath compartment.

Another object of the invention is to provide an apparatus useful in evaporative air coolers With non-metallic water bath compartments.

Another object of the invention is to provide a method of improving air quality produced by the use of evaporative air coolers with non-metallic water bath compartments by conditioning the water used in the evaporative air cooler.

Another object of the invention is to provide a method of conditioning the water used in evaporative air coolers with non-metallic water bath compartments.

Another object of the invention is to provide a method of conditioning the water used in evaporative air coolers with non-metallic water bath compartments without adding significant cost to the cost of operation of the cooler.

Another object of the invention is to provide a method of reducing the air borne allergens produced by evaporative air coolers having a housing with a non-metallic water bath compartment.

A further object of the invention is to reduce the musty odor of the air produced from evaporative air coolers with non-metallic water bath compartments.

A further object of the invention is to extend the useful life of the porous high surface area material used in evaporative air coolers having a housing with a non-metallic water bath compartment.

DETAILED DESCRIPTION

Figure 1:
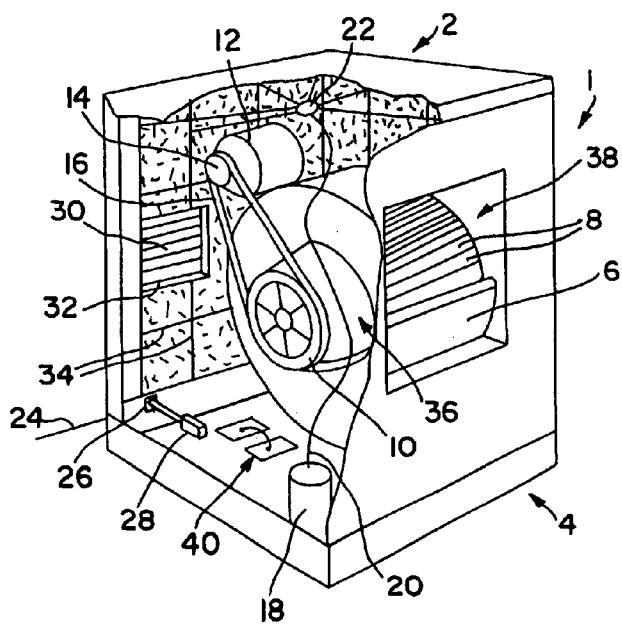
FIG. 1 is a perspective view of an evaporative air cooler employing the invention with certain sections cutaway for clarity.

In FIG. 1 there is shown an evaporative air cooler employing the method and apparatus of the invention in which an evaporative air cooler is shown with a non-metallic housing 1 generally produced from fiberglass or plastic and having a top 2, a bottom 4, and four sides. However it is visualized that the apparatus of the invention and the method of the invention are useful with an evaporative air cooler in which only the bottom 4 is produced from non-metallic materials, but it is common for the top 2, bottom 4 and the four sides of the housing to be produced from the same or similar non-metallic material. The non-metallic bottom 4 is essentially water-tight and forms a water bath compartment sufficient to hold water at a depth of from 1 to 6 inches, but more generally from 2 to 4 inches. One of the sides of the non-metallic housing 1 comprises the air exit 38 of forced air fan 6. The other three sides are essentially identical to one another and comprise a louvered outside surface 30. Adjacent to the louvered outside surface 30 is a porous high surface area material 32 with a portion cutaway in order to show the louvers in the louvered outside surface 30. The porous high surface area material is normally made from finely shaved or shredded wood or cellulosic materials. One of the more common materials used for the porous high surface area material is shaved or shredded aspen wood. Inside support means 34 is adjacent the porous high surface area material 32 so that the porous high surface area material 32 is sandwiched between the louvered outside surface 30 and the inside support means 34.

Again referring to FIG. 1, there is shown the fan blades 8, fan pulley 10, electric motor 12, electric motor pulley 14 and fan belt 16. Also, there is shown a source of water 24 connected to water valve 26, having an arm and float 28 attached thereto. The water must contain enough electrolytes so that the water will conduct electricity. But this is not a problem in essentially all evaporative air cooler installations where industrial water or water from water wells is used and the electrolytes in the water are concentrated as the water is evaporated. In addition there is shown a water pump 18, water pump hose 20, and water distributor 22. The apparatus of the invention 40 used for, practicing the method of the invention is shown in both FIGS. 1 and 2 and will be described in detail later.

It should be mentioned that evaporative air coolers are know to exist in which the air exit of the cooler is built into the bottom of the cooler so that the cooled air exiting the cooler is discharged in a downward direction. Accordingly the forced air fan is built into the bottom of the cooler so that the bottom is watertight and will support the necessary level of water for proper functioning of the cooler. Also, evaporative air coolers are known with the forced air fan built into the top of the cooler so that the cooled air exiting the cooler is discharged in an upward direction. In either of these variations, the forth side may be built with louvers and contain porous high surface area material or it may be simply a flat panel without louvers and porous high surface area material. These variations in evaporative cooler designs are mentioned for completeness and evaporative air coolers with side, bottom or top air discharge means are useful with the invention; however, drawings showing such variations are not necessary to fully disclose the invention to one skilled in the art and have not been included in the figures. The side air discharge evaporative cooler shown in FIG. 1 is the most common design and will be used to describe the invention.

In the operation of the evaporative air cooler shown in FIG. 1, air is sucked into the interior of housing 1 through the louvers of the louvered outside surface 30. As the air passes to the inside of the non-metallic housing is passes through the porous high surface area material 32. At the same time the air passes through the porous high surface area material, it is contacted with water particles dripping down the porous high surface area material 32. The water is pumped from non-metallic bottom 4 of the housing 1. The water valve 26 maintains a level of water in non-metallic bottom 4 of housing 1 as determined by the height of the water level float 28. Normally the water level is within the range of 1 to 6 and preferably 2 to 4 inches in non-metallic bottom 4 of housing 1 so as to keep the suction (not shown) of the water pump 18 well below the water level and as importantly to cover apparatus 40 or 50 the purpose of which will be explained later. The water pump 18 pumps the water through the water pump hose 20 and to the water distributor 22 and the water distributor discharges the water at one or more points along the top the porous high surface area material 32 located in each of the three sides. As the water trickles down the surfaces of the porous high surface area material 32 and contacts the air passing through the louvered outside surface 30 and the porous high surface area material 32 the air vaporizes some of the water and is thereby cooled. The water that is not evaporated is discharged into the water in bottom 4 of the non-metallic housing 1 and is re-circulated to the porous high surface area material 32. The cooled air is then drawn into the air entrance 36 of the forced air fan 6 and discharged via air discharge duct 38 directly into a room (not shown) to be cooled or carried through appropriate means to the desired area to be cooled.

According to the method and apparatus of the invention, the invention implementing device 40 is submerged beneath the water in non-metallic bottom 4 of housing 1. As shown more clearly in FIG. 2, the invention implementing device 40 comprises a first primary member 42 comprising zinc, a second primary member 44 comprising any metal more noble than zinc, and an electrical connection means 46, such as a copper wire or other suitable means. The purpose of the second primary member and the electrical connection means is to produce a galvanic cell with the first primary member comprising zinc whereby the first primary member is the anode of the galvanic cell. Thus as used herein, the term "any metal more noble than zinc" is intended to include metals or alloys of metals such as for example, iron, tin, lead, copper, silver, platinum and gold. While not normally considered a metal, graphite is known to be useful to form a galvanic cell with zinc and could be used to practice the invention. However, from the practical standpoint of durability, cost and galvanic activity, it has been found that metals comprising copper or copper alloys such as bronze and brass are the best materials to use for the second primary member in practicing the invention.

Again referring to FIGS. 1 and 2, electrical connection means 46 electrically connects first primary member 42 to the second primary member 44. Electrical connection means 46 is firmly attached to the first primary member 42 at attachment point 47 and attached to the second primary member 44 at attachment point 48, such as by soldering electrical connection means 46 to the first primary member 42 and the second primary member 44. The attachment points 47 and 48 are such that electromotive current is generated between the zinc and the copper or copper alloy so as to release zinc ions to the water contained in bottom 4 of housing 1.

The air sucked into the interior of the evaporative air cooler normally carries a number of air borne allergens, such as for example, mold and mildew spores and/or various bacteria that exist naturally in the atmosphere but vary in different regions of the world. When exposed to the warm, moist conditions in an evaporative air cooler that does not contain the invention implementing device 40, the air borne allergens grow, contaminate the water being re-circulated to the porous high surface area material and are carried along in the air discharged through air exit 38. Also as the mold, mildew and bacteria feed and multiply, they grow on the porous high surface area material and cause the porous high surface area material to deteriorate.

Figure 2:
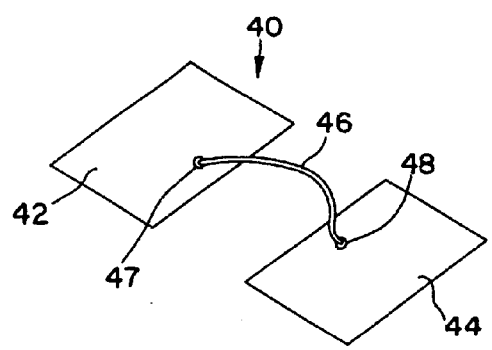
FIG. 2 is a perspective view of one embodiment of the apparatus of the invention shown in FIG. 1 to practice the method of the invention.
Figure 3:
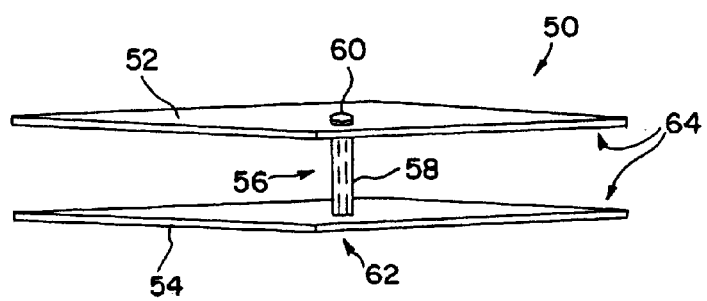
FIG. 3 is a perspective view of another embodiment of the apparatus of the invention that is also useful to practice the method of the invention.

When the invention implementing device 40, such as the one shown in FIGS. 1 and 2 or the invention implementing device 50 as shown in FIG. 3 is submerged in the water contained in non-metallic bottom 4 of housing 1, zinc ions are released to the water. The zinc ions are released in significant quantity to impart a biocidal and fungicidal quality to the water. The water containing the zinc ions is pumped to the top of the porous high surface material and the water that is not vaporized by the air passing through the porous high surface area material trickles down to the bottom of the housing and back into the water in the water bath. The water containing the zinc ions significantly reduces the growth of the mold, mildew and bacteria feeding on and growing on the porous high surface area material. The result is a substantial reduction in the concentration of the air borne allergens in the water and on the surface of the porous high surface area material, thus reducing the amount of air borne allergens picked up and carried by the air cooled by the evaporative air cooler.

FIG. 3 shows a preferred embodiment of a device useful to carry out the method and apparatus of the invention. As shown in FIG. 3, the device 50 comprises a zinc plate 52, a plate 54 comprising copper or an alloy of copper, such as bronze or brass. Plates 52 and 54 are firmly attached to one another so that electromotive current is generated and zinc ions are released to the water as previously described above regarding the embodiment of the invention described in FIGS. 1 and 2. In FIG. 3, electrical connection means 56 is rigidly attached to plates 52 and 54 and comprises a spacer 58 (which is shown as a round pipe, but other shapes can be employed), a metal bolt 60 passing through plate 52, spacer 58, plate 54 and attaching to metal nut 62 (not shown). Spacer 58 should be of sufficient length so that the gap 64 between, plates 52 and 54 is large enough for water to freely flow around the surface of plates 52 and 54. It is also visualized that electrical connection means 56 could be constructed a variety of different ways with the main purpose of providing an electrical connection between plates 52 and 54. As shown in the drawing the head of bolt 60 protrudes beyond the flat surface of plate 52 and while not shown, it is clear that nut 62 can be installed so as to protrude beyond the surface of plate 54. By having the head of bolt 60 protrude beyond the surface of plate 52 and by having nut 62 protrude beyond the surface of plate 54, whether plate 52 or 54 is lying next to bottom 4, water is freely in contact with all surfaces of invention implementing device 50. Obviously, plates 52 and 54 can be formed in any desired shape and plate 52 can be a different shape than plate 54. In this preferred embodiment, other advantages are provided by having plate 52 and plate 54 substantially parallel to minimize the level of water in bottom 4 needed to cover invention implementing device 50.

It is important in the practice of the invention to define the relationship between the volume of water in the water bath compartment and the surface area of the zinc plate freely in contact with the water in the water bath compartment. As used herein this relationship will be expressed in terms of the cubic inches of water in the water bath compartment per square inch of surface area of the zinc plate freely in contact with the water in the water bath, and hereinafter is referred to as the water-zinc or water to zinc ratio. Generally the water-zinc ratio will fall within a range of 4 to 8000 cubic inches of water per square inch of zinc. More specifically, the water-zinc ratio should be within the range of 25 to 4000 cubic inches of water per square inch of zinc. And still in a further preferred embodiment of the invention the water-zinc ratio should be within the range of 50 to 500 cubic inches of water per square inch of zinc in the water bath compartment. These ranges are important so that a sufficient amount of zinc ions are released to the water in the water bath to impart the proper biocidal and fungicidal quality to the water to significantly reduce the concentration of air borne allergens resulting from mold, mildew and other similar fungi and bacteria in the water and other areas of the evaporative air cooler. Also, these ranges are important so that the zinc sacrificial anode will last several years before replacement is necessary.

Also, for clarity, when calculating the surface area of the zinc plate freely in contact with the water in the water bath it is necessary to distinguish between the embodiment of the invention shown in FIGS. 1 and 2 and the embodiment of the invention shown in FIG. 3. Since the zinc plate 42 in FIG. 2 is a plate and as shown in FIG. 1, it is lying flat against the bottom 4 of housing 1, only the upper surface of zinc plate 42 is "freely in contact with the water in the water bath". Accordingly, only one side of zinc plate 42 would be used in the calculation of the water-zinc ratio. However, for the embodiment of the invention shown in. FIG. 3, both sides of zinc plate 52 should be used in the calculation of the water-zinc ratio. This is because device 50 shown in FIG. 3 is designed so that regardless of whether zinc plate 52 or plate 54 are positioned adjacent and parallel to the bottom of the evaporative cooler, both surfaces of zinc plate 52 will be freely in contact with the water in the water bath. More specifically, should plate 54 be positioned adjacent and parallel to bottom of the housing, zinc plate 52 would be suspended with both surfaces of zinc plate 52 freely exposed to the water in the water bath. Should zinc plate 52 be positioned adjacent to the bottom of the housing the top of metal bolt 60 will prevent zinc plate 52 from lying flat against the bottom of an evaporative cooler so again both sides of zinc plate 52 would be freely exposed to the water in the water bath. So for device 50, both sides of zinc plate 52 are "freely in contact with the water in the water bath" as that term is intended to be used herein and both sides of zinc plate 52; should be used for calculation of the water-zinc ratio.

It is also important in the practice of the invention for the surface area of the second primary member to be of sufficient size to promote the galvanic or electromotive current action of the invention implementing device. Depending upon the material used for the second primary member the larger the surface area of the second primary member as compared to the surface area of the first primary member the faster the first primary member is consumed. For example, the larger the surface area of the plate comprising copper or an alloy of copper compared to the surface area of the plate comprising zinc the quicker the plate comprising zinc is consumed with the understanding that when comparing the two surface areas, it is the surface area that is freely in contact with the water in the water bath that is the relevant or important surface area to consider. It has been found that this function can be described as a ratio of the surface area of the plate comprising zinc to the surface area of the plate comprising copper or a copper alloy such as bronze or brass. For purposes of describing the invention herein, this ratio will be referred to as the zinc to copper ratio whether the plate comprises copper or an alloy of copper such as bronze or brass. Generally the zinc to copper ratio (considering only the surface areas freely in contact with the water in the water bath) is within the range of 0.25 to 2 and more specifically within the range of 0.5 to 1.5. It is envisioned that most often, the zinc to copper ratio will be within the range of 0.8 to 1.2. It is also understood that the zinc to copper ratios above could be applied to cases where a metal more noble than zinc is used that is not copper or an alloy of copper. In those instances the surface area of the second primary member would normally be greater than the surface area of the first primary member the closer it is to zinc in the electromotive force series of metals.

Also to minimize the cost of using the method of the invention, it is important to reduce the cost of manufacturing the invention implementing devices as much as reasonably practical. Generally the invention implementing devices as shown in FIGS. 1,2 and 3 will have surface areas for each of plates 42 and 44 or plates 52 and 54, as applicable, within the range of 4 to 100 square inches and more specifically within the range of 8 to 60 square inches, considering both sides of the plate, but ignoring the surface area of the edges of the plate as normally each plate is relatively thin. Again referring to FIGS. 1,2 and 3, each plate would have a thickness within the range of from 0.005 to 0.5 inches and more specifically from 0.01 to 0.2 inches. Also, in a preferred embodiment shown in FIG. 3, spacer 58 would be made from a galvanized pipe having an outside diameter within the range of from 0.25 to 1.0 inch, preferably 0.5 to 0.75 inches and having a length within a range of from 0.25 to 1.0 inch and preferably within a range of 0.3 to 0.75 inches. The bolt 60 would normally be made from low strength steel, galvanized steel or brass and the nut 62 (not shown) would normally be made from low strength steel, galvanized steel or brass.

EXAMPLE OF THE INVENTION

In order to show the effectiveness of the present invention, an invention implementing device was placed in the water bath of an evaporative air cooler. The housing of the evaporative air cooler was constructed of a non-metallic material, namely fiberglass. The dimensions of the water bath compartment of the evaporative air cooler were 36 inches wide and 36 inches long. The water depth in the water bath compartment was maintained at a depth of about 2 inches.

The invention implementing device used was of the type shown in FIGS. 1 and 2. It has a zinc plate 2 inches wide, 9 inches long and 0.125 inches thick. A copper plate 2 inches wide, 9 inches long and 0.125 inches thick was also used. The two plates were connected together by an insulated 14 gage copper wire about 3 inches long. The one end of the copper wire was soldered to each plate. The plates were placed in the water bath lying flat on the bottom of the housing. The water-zinc ratio was 144 cubic inches of water per square inch of zinc, considering only one side of the zinc plate to calculate the surface area. Only one side was used because the plates were lying flat against the bottom of the evaporative air cooler substantially inhibiting the exposure of one side of the zinc plate to circulation of the water.

The evaporative air cooler has been in seasonal operation in a home in Grand Junction, Colo. since May 1998. At the time that the invention implementing device was installed, the evaporative cooler was almost new and had been in use for a short period of time. Evaporative air coolers in Grand Junction, Colo. are normally operated during the period of April to October of each year. Since using the invention, there has been no musty odor commonly associated with operating an evaporative air cooler. This is particularly surprising because the porous high surface area material has not been replaced in the evaporative air cooler since the method of the invention has been in use, namely, since May 1998.

The most common porous high surface area material in use today is shredded aspen wood which was used in this experiment. After using the shredded aspen wood for several months to a year, the mold and mildew feed on the aspen wood causing it to significantly loose its structural integrity indicated by the way it falls apart during its replacement with new material. New shredded aspen wood always changes from a bright yellowish color to a light gray color after several months of use. On close inspection of the shredded aspen wood used in the evaporative air cooler in this example of the invention and after four 6 month seasons of use, the structural integrity of the shredded aspen wood is substantially the same as new material. Even more surprising is that the shredded aspen wood still has the bright yellowish color of new shredded aspen wood. This is proof that the mold, mildew and bacteria were significantly reduced in the evaporative air cooler when using the apparatus and method of the invention.

Accordingly, by practicing the present invention, not only was there a major reduction of air borne allergens in the air cooled by the evaporative air cooler, but there was no need to replace the porous high surface area material. Thus the method of the invention results in significantly extending the useful life of the porous high surface area material. After using the method of the invention for four 6 month seasons, the porous high surface area material continues to function as if it were new and without significant signs of deterioration.

What is claimed is:

1. A method for reducing the amount of air borne allergens discharged from an evaporative air cooler having a water bath compartment made from non-metallic materials and containing water, said method comprises operating the evaporative air cooler wherein the water in the water bath compartment substantially covers a bimetallic device having a first primary member and a second primary member with the first primary member and the second primary member connected together by electrical connection means and wherein the first primary member comprises zinc and the second primary member comprises a metal more noble than zinc.

2. The method of claim 1 wherein the second primary member is selected from brass and/or bronze and the first primary member is zinc.

3. The method of claim 2 wherein the second primary member is brass.

4. The method of claim 1 wherein the volume of water in the water bath compartment is within the range of from 4 to 8000 cubic inches per square inch of zinc freely in contact with water in the water bath compartment.

5. The method of claim 1 wherein the volume of water in the water bath compartment is within the range of from 25 to 4000 cubic inches per square inch of zinc freely in contact with water in the water bath compartment.

6. The method of claim 1 wherein the volume of water in the water bath compartment is within the range of from 50 to 500 cubic inches per square inch of zinc freely in contact with water in the water bath compartment.

7. The method of claim 3 wherein the surface area of each of the first and second primary members exposed to the water in the water bath compartment are within the range of 4 to 100 square inches considering both sides of each of said primary members.

8. The method of claim 3 wherein the surface area of each of the first and second primary members exposed to the water in the water bath compartment are within the range of 8 to 60 square inches considering both sides of each of said primary members.

9. The method of claim 3 wherein (1) the volume of water in the water bath compartment is within the range of from 50 to 500 cubic inches per square inch of zinc, (2) a zinc to copper ratio is within the range of 0.8 to 1.2, (3) the surface area of each of the first and second primary members exposed to the water are within the range of 8 to 60 square inches considering both sides of each of said primary members, (4) the thickness of each of the primary members is within the range of 0.01 to 0.2 inches, (5) the porous high surface area material is shredded aspen wood, (6) and the non-metallic materials are fiberglass.

10. A method for extending the useful life of a porous high surface area material used in an evaporative air cooler having a water bath compartment made from non-metallic materials and containing water, wherein said method comprises operating the evaporative air cooler wherein the water substantially covers a bimetallic device having a first primary member and a second primary member with the first primary member arid the second primary member connected together by electrical connection means and wherein the fist primary member comprises zinc and the second primary member comprises a metal more noble than zinc.

11. The method of claim 10 wherein the volume of water in the water bath compartment is within the range of from 4 to 8000 cubic inches per square inch of zinc freely in contact with water in the water bath compartment.

12. The method of claim 10 wherein the volume of water in the water bath compartment is within the range of from 25 to 4000 cubic inches per square inch of zinc freely in contact with water in the water bath compartment.

13. The method of claim 10 wherein the volume of water in the water bath compartment is within the range of from 50 to 500 cubic inches per square inch of zinc freely in contact with water in the water bath compartment.

14. The method of claim 10 wherein the porous high surface area material is selected from shredded wood or cellulosic materials.

15. The method of claim 10 wherein the porous high surface material is shredded aspen wood.

16. The method of claim 10 wherein the second primary member is selected from brass and/or bronze and the first primary member is zinc.

17. The method of claim 16 wherein the second primary member is brass.

18. The method of claim 17 wherein (1) the volume of water in the water bath compartment is within the range of from 50 to 500 cubic inches per square inch of zinc, (2) a zinc to copper ratio is within the range of 0.8 to 1.2, (3) the surface area of each of the first and second primary members exposed to the water are within the range of 8 to 60 square inches considering both sides of each of said primary members, (4) the thickness of each of the primary members is within the range of 0.01 to 0.2 inches, (5) the porous high surface area material is shredded aspen wood, and (6) and the non-metallic materials are fiberglass.

19. An apparatus comprising a first primary member and a second primary member with the first primary member and the second primary member connected together by electrical connection means, wherein the first primary member comprises zinc and the second primary member comprises a metal more noble than zinc and wherein the first primary member is rigidly connected to the second primary member.

20. The apparatus of claim 19 wherein the first primary member is substantially parallel to the second primary member.

21. The apparatus of claim 19 wherein the first primary member is selected from brass and/or bronze.

22. The apparatus of claim 19 wherein the first primary member is substantially parallel and rigidly connected to the second primary member.

23. The apparatus of claim 19 wherein the zinc to copper ratio is within the range of 0.25 to 2.

24. The apparatus of claim 19 wherein the zinc to copper ratio is within the range of 0.5 to 1.5.

25. The apparatus of claim 19 wherein the zinc to copper ratio is within the range of 0.8 to 1.2.

26. The apparats of claim 19 wherein (1) the first primary member is zinc, the second primary member is brass, the electrical connection means is a galvanized pipe with a brass bolt passing through the fist primary member, then the pipe and then the second primary member and a galvanized steel nut attached to the other end of the bolt adjacent the second primary member so as to fix the position of one surface of the first primary member substantially parallel to one surface of the second primary member, wherein (2) the pipe has an outside diameter within the range of from 0.5 to 0.75 inches and a length within the range of 0.3 to 0.75 inches, (3) a zinc to copper ratio within the range of 0.8 to 1.2, (4) the surface area of each of the first and second primary members is within the range of 8 to 60 square inches considering both sides of each of said primary members, and (5) the thickness of each of said primary members is within the range of 0.01 to 0.2 inches.

* * * * *